United States Patent
Sponheimer et al.

(10) Patent No.: US 10,160,347 B2
(45) Date of Patent: Dec. 25, 2018

(54) ELECTRIC MOTOR VEHICLE AND OPERATING METHOD FOR AN ELECTRIC MOTOR VEHICLE

(71) Applicant: FORD GLOBAL TECHNOLOGIES, LLC, Dearborn, MI (US)

(72) Inventors: Arnulf Sponheimer, Aachen (DE); Brian Gillespey, Gregory, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/130,102

(22) Filed: Apr. 15, 2016

(65) Prior Publication Data
US 2016/0303996 A1  Oct. 20, 2016

(30) Foreign Application Priority Data
Apr. 16, 2015  (DE) .................. 10 2015 206 919

(51) Int. Cl.
*B60L 15/20* (2006.01)
*B60L 11/18* (2006.01)

(52) U.S. Cl.
CPC ....... *B60L 15/2045* (2013.01); *B60L 11/1803* (2013.01); *B60L 2240/423* (2013.01); *B60L 2240/507* (2013.01); *B60L 2260/24* (2013.01); *Y02T 10/7005* (2013.01); *Y02T 10/7241* (2013.01); *Y02T 10/7275* (2013.01)

(58) Field of Classification Search
USPC ........................................................ 701/22
See application file for complete search history.

(56) References Cited

U.S. PATENT DOCUMENTS

| | | | | |
|---|---|---|---|---|
| 4,730,151 A | * | 3/1988 | Florey ..................... | B60L 7/006 318/376 |
| 4,798,053 A | * | 1/1989 | Chang ..................... | B60K 6/12 180/165 |
| 4,949,362 A | * | 8/1990 | Gaubatz ............... | G01R 31/025 361/48 |
| 5,505,277 A | * | 4/1996 | Suganuma ............... | B62M 6/45 180/206.3 |
| 5,923,093 A | * | 7/1999 | Tabata ................... | B60K 6/365 290/40 C |
| 5,931,245 A | * | 8/1999 | Uetake ..................... | B60L 3/00 180/65.8 |

(Continued)

*Primary Examiner* — Jean Paul Cass
(74) *Attorney, Agent, or Firm* — Carlson, Gaskey & Olds

(57) ABSTRACT

The disclosure concerns an operating method for an electric motor vehicle with at least one electrical machine as the traction motor and with an operating element for preselecting a coasting function, wherein, if the coasting function is preselected by the driver, under predetermined conditions the operating mode is automatically changed into a coasting mode, in which neither a drive torque nor a drag torque is exerted on the wheels of the vehicle. According to the disclosure, the predetermined conditions include the conditions that the gas pedal is in a neutral position and that the current speed of the vehicle is at or is greater than a preset value. Under the predetermined conditions the operating mode is automatically changed into the coasting mode by bringing the drive train of the vehicle into a state in which the at least one electrical machine is consuming no electrical energy.

27 Claims, 2 Drawing Sheets

(56) References Cited

U.S. PATENT DOCUMENTS

| | | | | |
|---|---|---|---|---|
| 6,090,008 | A * | 7/2000 | Hoshiya | F16H 61/061 477/118 |
| 6,488,345 | B1 * | 12/2002 | Woody | B60L 7/10 180/165 |
| 7,658,248 | B2 * | 2/2010 | Kaya | B60K 6/445 180/65.21 |
| 7,921,945 | B2 * | 4/2011 | Harris | B60K 6/48 180/65.1 |
| 8,888,638 | B2 * | 11/2014 | Mueller | B60K 6/365 475/5 |
| 9,018,812 | B2 * | 4/2015 | Gimlan | H02K 7/025 310/67 A |
| 9,266,530 | B2 * | 2/2016 | Ideshio | B60W 20/14 |
| 9,682,699 | B2 * | 6/2017 | Nefcy | B60W 20/30 |
| 2001/0022245 | A1 * | 9/2001 | Rogg | B60K 6/365 180/65.21 |
| 2003/0221882 | A1 * | 12/2003 | Long | B60L 7/10 180/65.265 |
| 2007/0072737 | A1 * | 3/2007 | Dickinson | B60W 10/02 477/176 |
| 2007/0095586 | A1 * | 5/2007 | Luedtke | B60K 1/00 180/65.31 |
| 2010/0151991 | A1 * | 6/2010 | Mair | B60W 10/02 477/77 |
| 2010/0248896 | A1 * | 9/2010 | Dreier | F16H 61/0213 477/118 |
| 2011/0169432 | A1 * | 7/2011 | Dean | H02P 7/2805 318/3 |
| 2012/0077633 | A1 * | 3/2012 | Mueller | B60K 6/365 475/5 |
| 2012/0123624 | A1 * | 5/2012 | Sato | B60L 7/14 701/22 |
| 2012/0220422 | A1 * | 8/2012 | Wurthner | B60W 10/02 477/79 |
| 2012/0220424 | A1 * | 8/2012 | Staudinger | B60W 30/16 477/80 |
| 2013/0162009 | A1 * | 6/2013 | Mitts | B60L 3/102 303/3 |
| 2013/0260957 | A1 * | 10/2013 | Ueda | B60K 6/52 477/5 |
| 2015/0291161 | A1 * | 10/2015 | Amano | B60K 31/00 701/93 |
| 2016/0009349 | A1 * | 1/2016 | Kooi, Jr. | F16M 13/02 440/6 |
| 2016/0244057 | A1 * | 8/2016 | Kelly | B60W 30/143 |
| 2017/0050536 | A1 * | 2/2017 | Martin | B60W 10/10 |

* cited by examiner

ELECTRIC MOTOR VEHICLE AND OPERATING METHOD FOR AN ELECTRIC MOTOR VEHICLE

CROSS REFERENCE TO RELATED APPLICATIONS

This application claims priority to German Patent Application No. 10 2015 206 919.2, which was filed on Apr. 16, 2015, the entire contents of which are expressly incorporated herein by reference.

BACKGROUND AND SUMMARY

The disclosure concerns an operating method for an electric motor vehicle, i.e. for a motor vehicle with at least one electrical machine but no internal combustion engine as the traction engine, and with an operating element for preselecting a coasting function, wherein, if the coasting function is preselected by the driver, under certain conditions there is an automatic change into a coasting mode, in which neither a drive torque nor a drag torque is exerted on the wheels of the vehicle. Moreover, the disclosure concerns an electric motor vehicle that is designed to carry out the method.

One such method is known from DE 10 2007 035 424 A1. It relates particularly to hybrid vehicles that comprise at least one electrical machine as a traction motor in addition to an internal combustion engine, yet an electrical machine is also intended to be able to be provided as a sole drive.

With such vehicles, energy recovery is usually carried out if the driver releases the gas pedal, wherein the electrical machine is operated as a generator for charging up an electrical energy reservoir, such as for example a traction battery.

However, with a hybrid vehicle the kinetic energy of the vehicle should not be recovered, i.e., stored in the energy reservoir, in all driving states with the gas pedal released. Rather, it is sometimes advantageous to provide free rolling for as long as possible, an operating state in which the traction motor is decoupled from the drive train or switched off. One such operating state, in which the wheels of the vehicle roll freely, is called coasting.

With the aforementioned known method, the driver has the option of deliberately selecting the coasting function by means of a dedicated operating element, for example on the gear selector lever, or by means of a pressure point gas pedal. In an alternative, the coasting function is associated with a released pedal set. If the driver has activated the coasting function, there is always an automatic change into the coasting mode if this has no effect on the driving dynamics. For reasons of energy efficiency, when coasting the clutch is disengaged and the internal combustion engine switched off and/or electrical machines are operated in the energy-saving state.

Directly coupled synchronous machines with permanent magnet excitation are usually used as electrical machines for electric motor vehicles. If no energy is delivered to such a synchronous machine while driving, the counter EMF produces a drag torque in the synchronous machine and hence an increased rolling resistance of the vehicle, which results in higher energy consumption and reduced range. The most efficient energy-saving mode is then to just deliver enough energy to the synchronous machine such that it exerts neither a positive nor a negative torque on the wheels. Yet even in this state some energy is consumed.

The object of the disclosure is to specify an operating method for an electric motor vehicle that enables a particularly economical and ergonomic coasting mode.

This object is achieved by a method and by a device with the features of the independent claims.

Advantageous developments of the disclosure are given in the dependent claims.

According to the disclosure, the predetermined conditions are first that the gas pedal is in a neutral position, i.e. in a position in which the driver is exerting no torque on the gas pedal, and secondly that the current speed of the vehicle is at or is exceeding a preset value.

This is based on the knowledge that with electric motor vehicles it has often proved to be inefficient to carry out a coasting mode at low vehicle speeds, and also that drivers are more likely to neither expect nor want a coasting mode in such cases. Rather, it has been shown that when using the disclosure drivers have to activate the coasting function and deactivate it again less often and therefore are able to and want to use the coasting function longer overall.

Moreover, with the disclosure the automatic change into the coasting mode is carried out by bringing the drive train of the vehicle into a state in which the at least one electrical machine is consuming no electrical energy.

The latter state is achieved in one embodiment of the disclosure owing to the electrical machine being an asynchronous machine and being changed into the coasting mode by first changing from torque control to revolution rate control of the electrical machine and then switching off the current feed to the electrical machine.

The aforementioned energy-saving is achieved in another embodiment of the disclosure owing to the electrical machine being an externally excited synchronous machine with a separate or external excitation winding and being changed into the coasting mode by first changing from torque control to revolution rate control of the electrical machine, then switching off the excitation current to the excitation winding, then bringing the revolution rate of the motor to zero and then switching off the current feed to the electrical machine.

Alternatively, the aforementioned energy-saving can be achieved owing to the electrical machine being a synchronous machine with permanent magnet excitation and an electrically operated clutch or a freewheel being provided in the drive train downstream of the electrical machine, as is known from DE 10 2009 054 872 A1. In this case, a change is made into the coasting mode by first changing from torque control to revolution rate control of the electrical machine, then possibly opening the clutch, then bringing the revolution rate of the motor to zero, and then switching off the current feed to the electrical machine.

The preset value for the minimum speed of the vehicle, at which a change into the coasting mode can be made, is in one embodiment at least approximately 50 or 60 km/h, as is typical for larger urban roads or arterial roads, is approximately 80 km/h in another embodiment, and is approximately 100 km/h in yet another embodiment, i.e. as is typical for highways or freeways.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
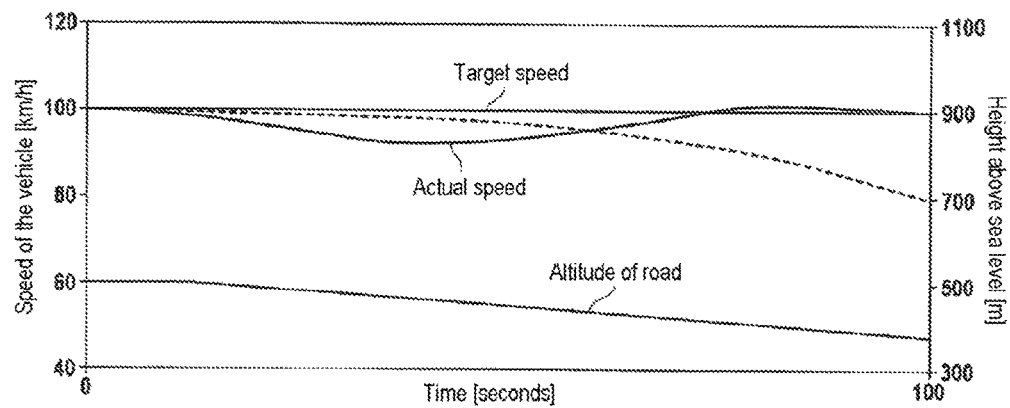
FIG. 1 shows a speed/time diagram of an electrical automobile on a road with a slight gradient.

FIG. 1 illustrates the driving behavior of an electric motor vehicle, namely of an electrical automobile, over a time period of 100 s on a road that declines in altitude during the time period by approx. 120 meters, as indicated by the bottom line in connection with the right ordinate.

The electrical automobile has an initial speed of 100 km/h at the start of the incline, which it should ideally maintain in the illustrated case, as indicated by the straight solid graph, if the gas pedal is in the neutral position. In this case, the force tending to accelerate the vehicle owing to its own weight would equal the rolling resistance.

However, with a conventional electrical automobile comprising a synchronous machine with permanent magnet excitation as the traction motor and with which energy recovery is carried out, if the driver releases the gas pedal the rolling resistance is increased by the drag torque of the motor caused by recovery and the vehicle would slow down over time, as indicated by the dashed line in FIG. 1. And even if in this case no energy recovery were to be carried out, a residual drag torque of the motor would remain owing to the induced counter EMF in the motor as an electrical machine, which slows the vehicle down.

In order to return to the target speed, sooner or later the driver must depress the gas pedal slightly, and the vehicle travels for example with the actual speed depicted in FIG. 1.

In this case, however, the overall energy balance is not optimal, because kinetic energy is converted into electrical energy, stored and converted back into propulsive energy, which is associated with conversion losses.

The synchronous machine could be run with a suitable current feed in order to keep the vehicle at the target speed all the time, but in this case too much electrical energy would be wasted.

Figure 2:
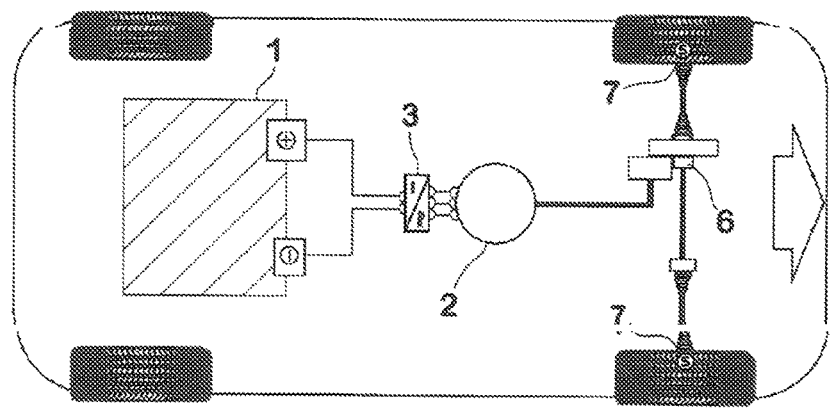
FIG. 2 shows a schematic diagram of a drive train of an electrical automobile with a coasting function.

FIG. 2 schematically illustrates the drive train of an electrical automobile with a coasting function that enables a coasting mode without wasting energy. The electrical automobile contains an electrical storage means 1 in the form of a traction battery (high voltage battery), a fuel cell and so on, an electrical machine 2 as the traction motor, in this case a synchronous machine with permanent magnet excitation (PSM), which is supplied with energy from the electrical storage means 1 by means of an inverter 3, a clutch 4 with an electrically operated clutch actuator 5 disposed between the electrical machine 2 and a front wheel differential 6 in the drive train, and front wheel revolution rate sensors 7.

The clutch 4 enables the current feed to the electrical machine 2 to be switched off without the vehicle being braked by the electrical machine 2, and in the coasting mode the target speed can be maintained without wasting electrical energy.

The same thing is possible if a freewheel is provided in the drive train instead of the clutch 4.

Figure 3:
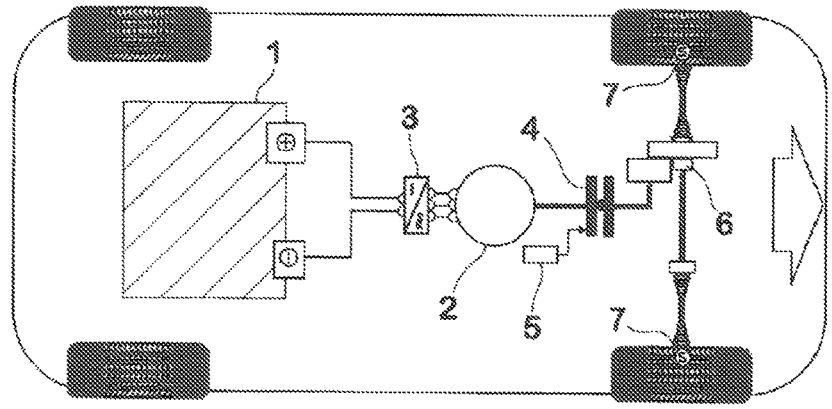
FIG. 3 shows an alternative design of the drive train of FIG. 2.

FIG. 3 schematically illustrates an alternative drive train of an electrical automobile with a coasting function that enables a coasting mode without wasting energy. This exemplary embodiment differs from the exemplary embodiment of FIG. 2 only in that the drive train has no clutch and clutch actuator and in that the electrical machine 2 is either an asynchronous machine, also known as an induction machine (IM), or an externally excited synchronous machine with a separate or external excitation winding (SSM).

Apart from internal friction, the electrical machine 2 produces no motor drag torque if the current feed is completely switched off, and the coasting mode can be carried out without wasting electrical energy.

Figure 4:
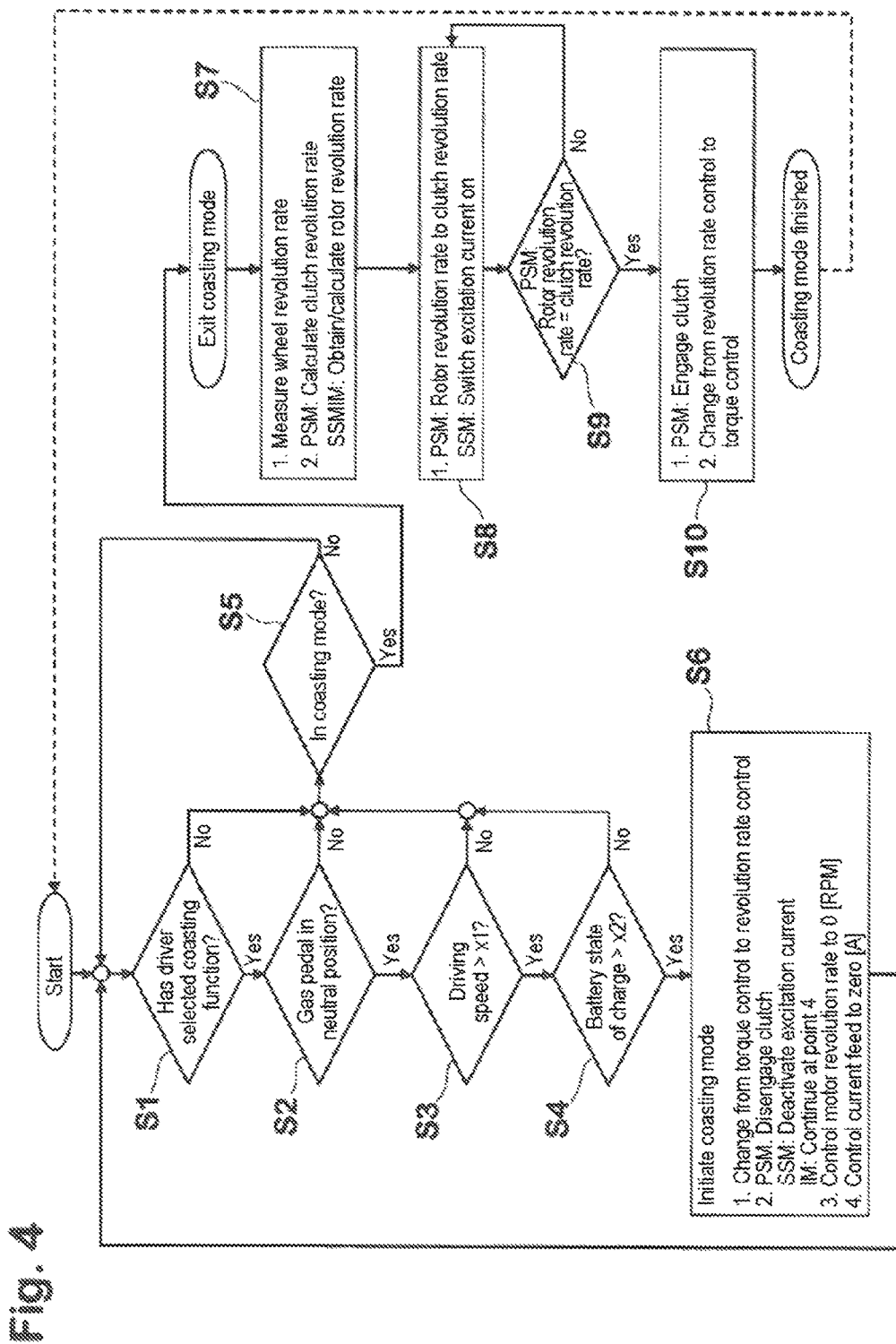
FIG. 4 shows a flow chart for describing an operating method for the electrical automobile.

Operating methods for the electrical automobiles described above will now be described using FIG. 4. This figure illustrates a software routine that is executed for example every 100 ms in a drive train controller, wherein the left half of the flow chart shows the conditions under which and how a coasting mode is initiated, while the right half of the flow chart shows how the coasting mode is exited if one of the conditions is no longer fulfilled.

The routine starts with starting up the vehicle, for example by turning an ignition key or similar. In step S1 a query is made as to whether an operating element for preselecting a coasting function is operated. The operating element can be a dedicated operating element, for example a defined position of a gear selector lever, for example designated with PRND C, or a switch on the instrument panel or in the foot well. Alternatively, the coasting function can for example be triggered by a certain combination or series of positions or movements of the pedal set.

If the operating element for preselecting a coasting function is operated, a query is made in step S2 as to whether the gas pedal is in its neutral position, which usually corresponds to 0% deflection from its rest position. If so, a query is made in step S3 as to whether the current speed of the vehicle is greater than a preset threshold value x1 of, for example, 100 km/h. If so, a query is made in step S4 as to whether the state of charge of the battery is greater than a preset threshold value x2.

If the response to any of the queries in steps S1 through S4 is no, a query is made in step S5 as to whether the vehicle is (still) in a coasting mode. If not, the process returns to step S1.

If the response in step S4 is yes, a procedure for initiating the coasting mode is carried out in step S6. For this purpose, there is first a change from torque control to revolution rate control of the electrical machine 2.

In the case of a drive train as in FIG. 2 with a synchronous machine with permanent magnet excitation (PSM) as the electrical machine 2, the clutch 4 is now disengaged by the clutch actuator 5.

In the case of a drive train as in FIG. 3 with a synchronous machine with a separate or external excitation winding (SSM) as the electrical machine 2, the excitation current is switched off.

In both the aforementioned cases, the revolution rate of the traction motor 2 is then brought to zero or left equal to zero. The entire current feed to the electrical machine 2 is then brought to zero Amperes, as also in the case in which the electrical machine 2 is an asynchronous machine (IM).

Following step S6, the routine returns to step S1. If in the next pass through the response to one of the queries in steps S1 through S4 is no, for example because the driver has deactivated the coasting function, and if the result of the query in step S5 indicates that the vehicle is (still) in a coasting mode, the procedure for exiting the coasting mode is carried out.

For this the wheel revolution rate is first measured in step S7. If the electrical machine 2 is a synchronous machine with permanent magnet excitation, the output side revolution rate of the clutch 4 is calculated therefrom. If the electrical machine 2 is a synchronous machine with a separate or external excitation winding or an asynchronous machine, the rotor revolution rate thereof is derived or calculated.

In the case of a synchronous machine with permanent magnet excitation, the rotor revolution rate thereof is then brought equal to the revolution rate of the clutch in step S8, and in the case of a synchronous machine with a separate or external excitation winding, the excitation current thereof is switched on.

In the case of a synchronous machine with permanent magnet excitation, a further query is made in step S9 as to whether the revolution rate of the rotor has reached the revolution rate of the clutch, and if not steps S8 and S9 are carried out again until the revolution rate of the rotor equals the revolution rate of the clutch.

Following steps S8 and S9, in step S10 the clutch 4 is engaged if the electrical machine 2 is a synchronous machine with permanent magnet excitation, and in all cases control of the electrical machine 2 is changed back from revolution rate control to torque control in order to terminate the coasting mode, and the routine returns to step S1.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An operating method for an electric motor vehicle with at least one electrical machine as a traction motor and with an operating element for preselecting a coasting function, wherein, in response to the coasting function being preselected by the driver, the operating mode is automatically changed into a coasting mode under predetermined conditions, in which mode neither a drive torque nor a drag torque is exerted on wheels of the vehicle by the at least one electrical machine, wherein the predetermined conditions comprise the condition that a gas pedal is in a neutral position, and that the current speed of the vehicle is at or is greater than a preset value, and that under the predetermined conditions the operating mode is automatically changed into the coasting mode by bringing the drive train of the vehicle into a state in which the at least one electrical machine is consuming no electrical energy by switching off a current feed to the at least one electrical machine.

2. The operating method as recited in claim 1, wherein the at least one electrical machine is an asynchronous machine (IM) and the operating mode is changed into the coasting mode by first changing from torque control to revolution rate control of the electrical machine and then switching off the current feed to the electrical machine.

3. The operating method as recited in claim 1, wherein the at least one electrical machine is an externally excited synchronous machine with a separate or external excitation winding (SSM) and the operating mode is changed into the coasting mode by first changing from torque control to revolution rate control of the electrical machine, then switching off the excitation current to the excitation winding, then bringing the revolution rate of the motor to zero and then switching off the current feed to the electrical machine.

4. The operating method as recited in claim 1, wherein the at least one electrical machine is a synchronous machine with permanent magnet excitation (PSM), an electrically operated clutch or a freewheel is provided in the drive train downstream of the electrical machine and the operating method is changed into the coasting mode by first changing from torque control to revolution rate control of the electrical machine, then disengaging the clutch, then bringing the revolution rate of the motor to zero, and then switching off the current feed to the electrical machine.

5. The operating method as recited in claim 1, wherein the preset value for the current speed of the vehicle is approximately 50 to 60 km/h.

6. The operating method as recited in claim 1, wherein the preset value for the current speed of the vehicle is approximately 80 km/h.

7. The operating method as recited in claim 1, wherein the preset value for the current speed of the vehicle is approximately 100 km/h.

8. The operating method as recited in claim 1, wherein the predetermined conditions comprise the condition that a battery state of charge is greater than a preset threshold value.

9. The operating method as recited in claim 1, wherein changing the operating mode into the coasting mode includes changing from a torque control to a revolution rate control of the at least one electrical machine, controlling a revolution rate of the at least one electrical machine to zero, and controlling the current feed of the at least one electrical machine to zero.

10. The operating method as recited in claim 1, comprising exiting the coasting mode if the current speed of the vehicle becomes less than the preset value.

11. An electric motor vehicle, comprising:
an electrical machine configured as a traction motor;
an operating element configured to allow a selection of a coasting mode; and
a controller configured to automatically control the electrical machine in the coasting mode if the operating element has been selected and a current driving speed of the electric motor vehicle is greater than a preset threshold value.

12. The electric motor vehicle as recited in claim 11, wherein the electrical machine is an asynchronous machine (IM).

13. The electric motor vehicle as recited in claim 11, wherein the electrical machine is a synchronous machine with a separate or external excitation winding (SSM).

14. The electric motor vehicle as recited in claim 11, wherein the electrical machine is a synchronous machine with permanent magnet excitation (PSM) and comprising an electrically operated clutch or a freewheel downstream of the electrical machine.

15. The electric motor vehicle as recited in claim 11, wherein the controller is configured to control the electrical machine in the coasting mode if a gas pedal is in a neutral position.

16. The electric motor vehicle as recited in claim 11, wherein the controller is configured to control the electrical machine in the coasting mode if a battery state of charge is greater than a preset threshold value.

17. The electric motor vehicle as recited in claim 11, wherein the controller is configured to stop controlling the electrical machine in the coasting mode if the current driving speed of the electric motor vehicle becomes less than the preset threshold value.

18. The electric motor vehicle as recited in claim 11, comprising a clutch actuable to control a current feed to the electrical machine.

19. The electric motor vehicle as recited in claim 11, wherein the controller is configured to automatically control the electric motor vehicle in the coasting mode by changing from a torque control to a revolution rate control of the electrical machine and controlling a revolution rate of the electrical machine to zero.

20. A method, comprising:
automatically controlling an electric motor vehicle in a coasting mode in which a current feed to an electric traction motor is switched off if a driver has selected a coasting function on an operating element, a gas pedal is in a neutral position, and a current driving speed of the electric motor vehicle is greater than a preset threshold value.

21. The electric motor vehicle as recited in claim 11, wherein the operating element is a defined position of a gear selector lever.

22. The electric motor vehicle as recited in claim 11, wherein the operating element is a switch located on an instrument panel or a foot well of the electric motor vehicle.

23. The electric motor vehicle as recited in claim 11, wherein a current feed to the electrical machine is shut off in the coasting mode.

24. The method as recited in claim 20, wherein the driver selects the coasting function on the operating element by positioning a gear selector lever in a defined position or triggering a switch located on an instrument panel or a foot well of the electric motor vehicle.

25. The method as recited in claim 20, comprising automatically controlling the electric motor vehicle in the coasting mode if a battery state of charge is additionally greater than a preset threshold value.

26. The method as recited in claim 20, wherein the electric motor vehicle excludes an internal combustion engine.

27. The method as recited in claim 20, wherein, during the coasting mode, neither a drive torque nor a drag torque is exerted on wheels of the electric motor vehicle.

\* \* \* \* \*